(12) United States Patent
Kumar et al.

(10) Patent No.: US 8,160,624 B2
(45) Date of Patent: Apr. 17, 2012

(54) SYSTEM AND METHOD FOR ASSIGNING A SENDERID

(75) Inventors: Manish Kumar, Bangalore (IN); Himanshu Gupta, Bangalore (IN); Manoj K, Bangalore (IN); Venkatesh Basappa Neldurg, Bangalore (IN); Ayaz Nabi, Bangalore (IN); Manish R. Shah, Mountain View, CA (US); Bala Dutt, Bangalore (IN); Harsha K. Navada, Bangalore (IN)

(73) Assignee: Intuit Inc., Mountain View, CA (US)

( * ) Notice: Subject to any disclaimer, the term of this patent is extended or adjusted under 35 U.S.C. 154(b) by 87 days.

(21) Appl. No.: 12/788,162

(22) Filed: May 26, 2010

(65) Prior Publication Data

US 2011/0294479 A1    Dec. 1, 2011

(51) Int. Cl.
*H04W 4/14* (2009.01)

(52) U.S. Cl. ............. 455/466; 455/558; 379/88.13
(58) Field of Classification Search ............. 455/466, 455/558; 379/88.13, 88.22, 88.16
See application file for complete search history.

(56) References Cited

U.S. PATENT DOCUMENTS

2008/0020798 A1*  1/2008  Jang et al. ............ 455/558
2011/0081007 A1*  4/2011  Bar-Yoav .............. 379/88.13

* cited by examiner

*Primary Examiner* — Phuoc Doan
(74) *Attorney, Agent, or Firm* — Osha-Liang LLP

(57) ABSTRACT

A method for sending Short Message Service (SMS) messages includes receiving a request to generate a senderID, determining senderIDs based on a business name, and receiving a selected senderID from the senderIDs. The method further includes receiving a request to send an SMS message using the selected senderID, and sending a request to an SMS server to send the SMS message using the senderID.

20 Claims, 6 Drawing Sheets

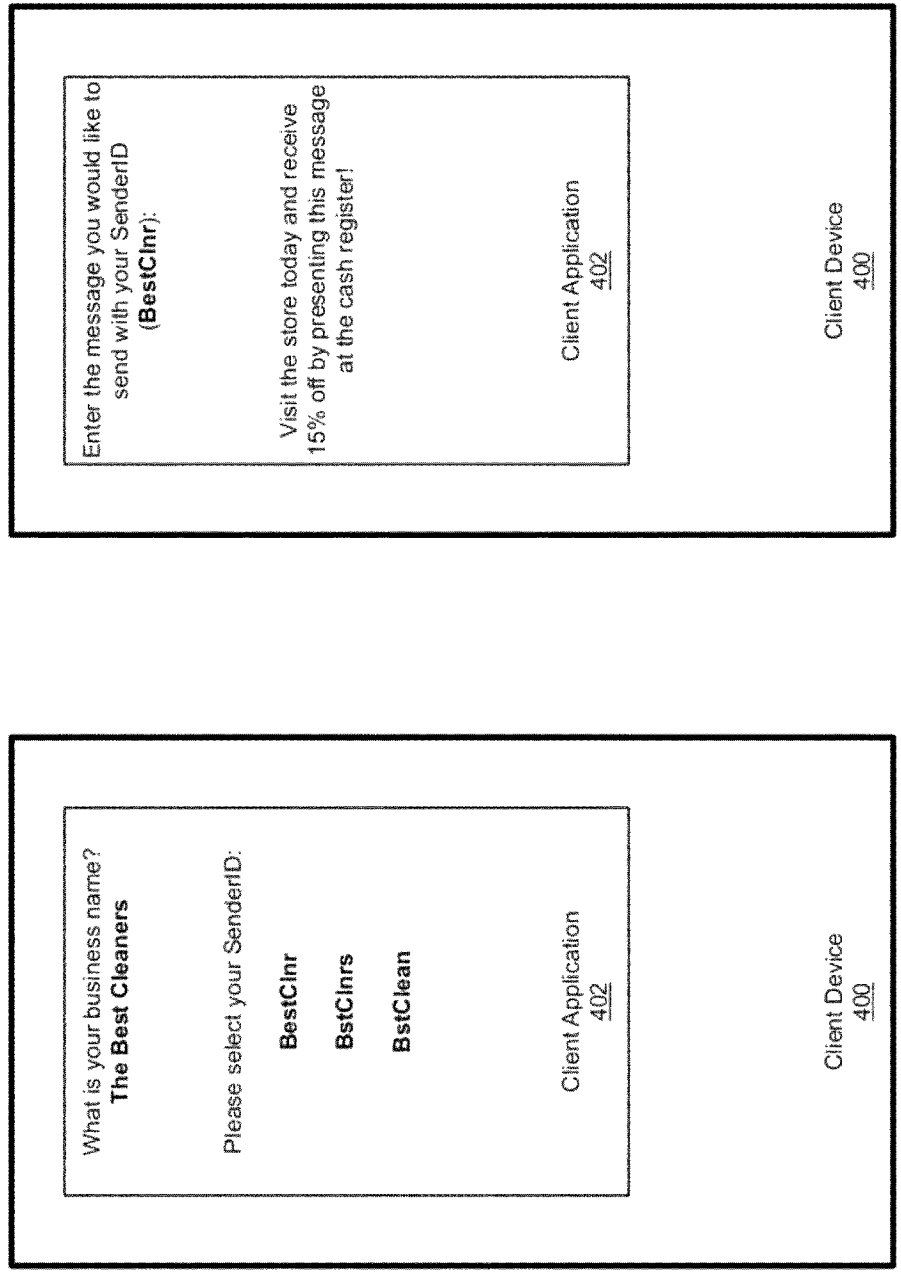

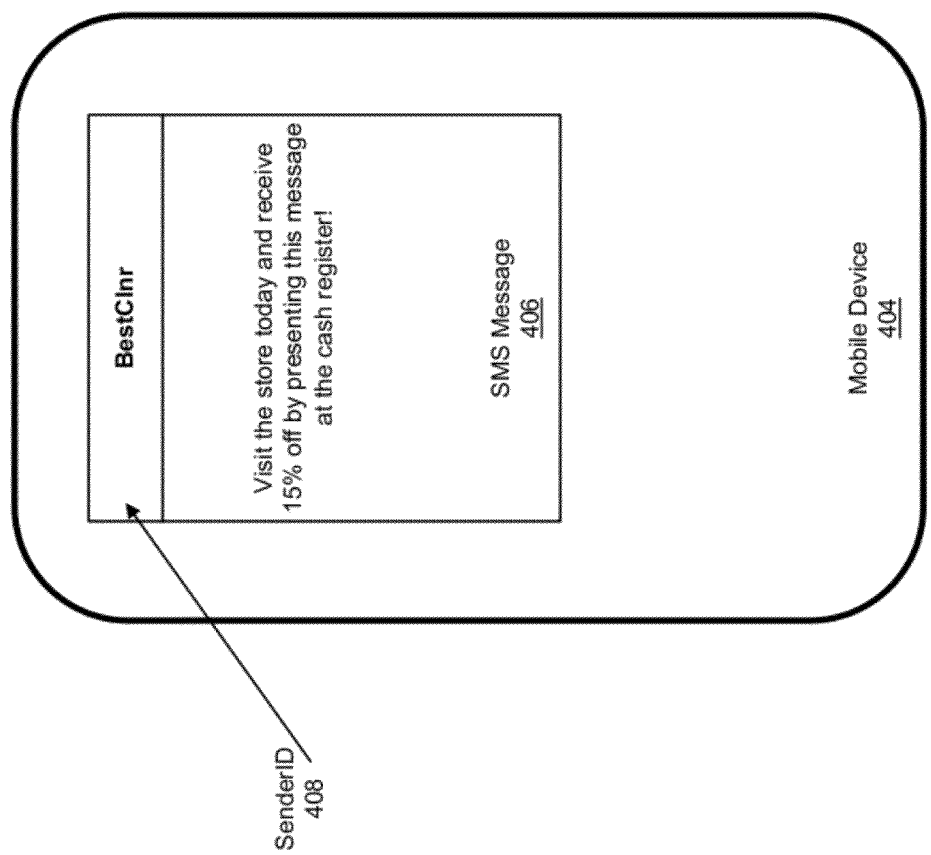

SYSTEM AND METHOD FOR ASSIGNING A SENDERID

BACKGROUND

Short Message Service (SMS) is the most widely used form of communication on the planet, with hundreds of billions of messages sent every month. Many mobile devices may have SMS functionality including, but not limited to, cell phones, Personal Digital Assistants (PDAs), laptop computers, handheld gaming devices, and many other devices. The uses of SMS messages span from personal messages sent to friends and family, to mass advertisements distributed to customers of a business. SMS messages typically identify the sender by phone number. While identification by phone number works well for close friends and family, when sending mass SMS messages a phone number may not clearly identify the sender.

SUMMARY

In general, in one aspect, the invention relates to a method for sending Short Message Service (SMS) messages with a SenderID. The method involves receiving, from a client device, a request to generate a senderID, wherein the request comprises a business name, and wherein the senderID is a shortened version of the business name for identifying a sender of an SMS message. The method further involves determining a plurality of senderIDs based on the business name, receiving, from the client device, a selected senderID from the plurality of senderIDs, receiving, from the client device, a request to send an SMS message comprising the selected senderID, sending a request to an SMS server to send the SMS message, wherein the SMS message comprises the selected senderID, and wherein the SMS server sends the SMS message to a plurality of mobile devices.

In general, in one aspect, the invention relates to a system for sending SMS messages with a SenderID. The system includes a client device and a short-name server, operatively connected to the client device and comprising a memory and a processor operatively connected to the memory having functionality to execute instructions for: receiving, from the client device, a request to generate a senderID, wherein the request comprises a business name, and wherein the senderID is a shortened version of the business name for identifying a sender of an SMS message, determining a plurality of senderIDs based on the business name, receiving, from the client device, a selected senderID from the plurality of senderIDs, receiving, from the client device, a request to send an SMS message comprising the selected senderID, sending a request to an SMS server to send the SMS message, wherein the SMS message comprises the selected senderID, and wherein the SMS server sends the SMS message to a plurality of mobile devices.

In general, in one aspect, the invention relates to a computer readable medium storing instructions for sending SMS messages with a SenderID. The instructions comprise functionality to receive, from a client device, a request to generate a senderID, wherein the request comprises a business name, and wherein the senderID is a shortened version of the business name for identifying a sender of an SMS message, determine a plurality of senderIDs based on the business name, receive, from the client device, a selected senderID from the plurality of senderIDs, receive, from the client device, a request to send an SMS message comprising the selected senderID, send a request to an SMS server to send the SMS message, wherein the SMS message comprises the selected senderID, and wherein the SMS server sends the SMS message to a plurality of mobile devices.

Other aspects and advantages of the invention will be apparent from the following description and the appended claims.

BRIEF DESCRIPTION OF DRAWINGS

FIGS. 4A-C show an example in accordance with one or more embodiments of the invention.

DETAILED DESCRIPTION

Figure 1:
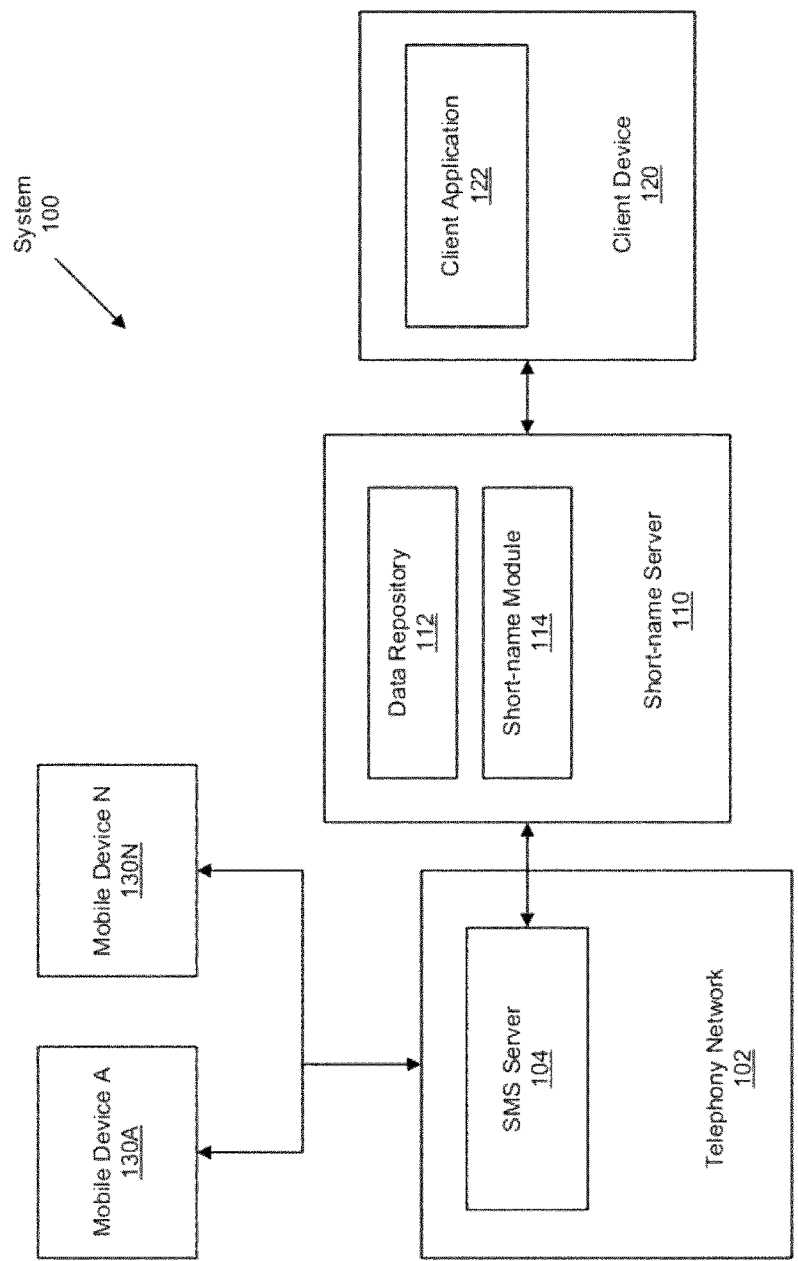
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more through understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for sending Short Message Service (SMS) messages. Specifically, SMS messages sent using the invention will use a short name, called a senderID, to identify the sender, rather than the phone number of the sender. Initially, a business name is received, and potential senderIDs are generated based off the business name. After a user selects her senderID, a request to send an SMS using the senderID is received. The system then sends a request to an SMS server to send the SMS with the senderID identifying the sender.

A senderID is a short name used to identify a sender of an SMS message. In one or more embodiments of the invention, the senderID replaces the phone number as identifying the sender. The length of the senderID may vary by country, region, telephony network, etc. For example, a typical senderID may be between 8 and 11 characters long. However, it will be apparent to one of ordinary skill in the art that a senderID is not limited to the lengths in the above example. Additionally, in some countries or regions, the amount of characters allotted for a senderID may be less than the total number of characters available. For example, a government, or other organization, may require that the first three characters of a senderID may be reserved for identification, or other, purposes. It will be apparent to one of ordinary skill in the art that any number of characters may be reserved for a use other than a senderID and, as such, the invention should not be limited to any particular configuration of characters or length. In one or more embodiments of the invention, senderIDs are human-readable. In other words, when read by a receiver of an SMS with a senderID, the senderID will be easily associated with the full name of the sender.

Throughout this specification SMS messages are referred to as the designated format for messaging. However, the invention is not limited strictly to SMS formatted messages. The invention may be applied to other message formats including, but not limited to: Multimedia Messaging Service (MMS), Enhanced Messaging Service (EMS), Short Message Peer-to-Peer (SMPP), and many other formats. It will be apparent to one of ordinary skill in the art that the invention may be easily applied to many different messaging formats and, as such, the invention should not be limited to the above examples.

FIG. 1 shows a diagram of a system in accordance with one or more embodiments of the invention. As shown in FIG. 1, System (100) includes Telephony Network (102), SMS Server (104), Short-name Server (110), Data Repository (112), Short-name Module (114), Client Device (120), Client Application (122), Mobile Device A (130A), and Mobile Device N (130N). Each of the aforementioned components is discussed in detail below.

Telephony Network (102) may be any network, or component of a network, capable of handling telephony communications. In one or more embodiments, Telephony Network (102) may be controlled by a government, a corporation, or any other suitable entity. In one or more embodiments of the invention Telephony Network (102) may be communicatively connected to Short-name Server (110). Telephony Network (102) may also be communicatively connected to Mobile Device A (130A) and Mobile Device N (130N). It will be apparent to one of ordinary skill in the art that Telephony Network (102) may be comprised of many different numbers and types of components, and as such, should not be limited to any particular configuration. For example, Telephony Network (102) may contain SMS Server (104). SMS Server (104) may be responsible for sending and receiving SMS communications for Telephony Network (102). SMS Server (104) may also have other functionality or capabilities. SMS Server (104) may be any suitable device including, but not limited to, a computer, a server, etc.

Short-name Server (110) may by any device capable of executing instructions and acting as a server (e.g., desktop computer, laptop computer, servers, mobile devices, etc). In one or more embodiments of the invention, Short-name Server (110) may act as an intermediary between Telephony Network (102) and Client Device (120). Short-name Server (110) may be operated by a third party. Alternatively, the same party that operates Telephony Network (102) may operate Short-name Server (110). In one or more embodiments of the invention, Short-name Server (110) may comprise functionality for a web server, thereby allowing SMS messages to be sent using the Internet. Short-name Server (110) may also contain Data Repository (112) and Short-name Module (114).

Data Repository (112) may be for storing any data needed by or relevant to the invention. For example, senderIDs or messages waiting to be sent may be stored in Data Repository (112). It will be apparent to one of ordinary skill in the art that this is not an exhaustive list of things storable by Data Repository (112) and, as such, the invention should not be limited to the above examples. In one or more embodiments of the invention, Data Repository (112) may be communicatively connected to Short-name Module (114). Data Repository (112) may be located on the same device as Short-name Module (114). Alternatively, Data Repository (112) may be located on a separate device from Short-name Module (114).

Short-name Module (114) may be any software program or module. In one or more embodiments of the invention, Short-name Module (114) may provide functionality for sending SMS messages with a senderID. Additionally, Short-name Module (114) may determine senderIDs, as discussed later. In one or more embodiments of the invention, Short-name Module (114) may be a web application or module, providing the same functionality via the web that is provided to users of Client Application (122). It will be apparent to one of ordinary skill in the art that, in general, Short-name Module (114) provides any needed functionality to act as an intermediary and/or send SMS messages with a senderID and, as such, should not be limited to any specific configuration or functionality.

Client Device (120) may be any mobile device capable of executing instructions and sending SMS messages or accessing the Internet (e.g., laptop computer, cell phone, PDA, handheld gaming device, etc.). In one or more embodiments of the invention, Client Device (120) may have components including, but not limited to: input devices (not shown) (e.g., keyboard, touch screen, microphone, etc.), display (not shown) (e.g., screen, touch screen, etc.), a processor(s) (not shown), memory (not shown) and other components. It will be apparent to one of ordinary skill in the art that client devices may have many different components and, as such, the invention should not be limited to any particular configuration or particular client device. In one or more embodiments of the invention, Client Device (120) may be communicatively connected to Short-name Server (110) and/or Telephony Network (102). In one or more embodiments of the invention, Client Device (120) may be able to access the Internet. Alternatively, Client Device (120) may not be able to access the Internet. Additionally, Client Device (120) may be configured to execute instructions for Client Application (122).

Client Application (122) may be any software program or module capable of executing on Client Device (120). Client Application (122) may provide functionality for sending SMS messages with a senderID. This functionality may be provided by configuring Client Device (120) to communicate with Short-name Server (110). In one or more embodiments of the invention, Client Application (122) may determine senderIDs, as discussed later. Client Application (122) may provide a Graphical User Interface (GUI) for sending SMS messages with a senderID.

Mobile Device A (130A) and Mobile Device N (130N) may be any mobile device capable of receiving SMS messages from a telephony network (e.g., Telephony Network (102)). Mobile Device A (130A) and Mobile Device N (130N) may be, for example, a cell phone, PDA, smart phone, laptop, portable gaming device, media player, or any other suitable device. In one or more embodiments of the invention, Mobile Device A (130A) and Mobile Device N (130N) may be located on Telephony Network (102). Alternatively, Mobile Device A (130A) and Mobile Device N (130N) may be located on a different telephony network (not shown). It will be apparent to one of ordinary skill in the art that Mobile Device A (130A) and Mobile Device N (130N) are the recipients of a message with a senderID and, as such, should not be limited to the above examples and configurations.

Figure 2:
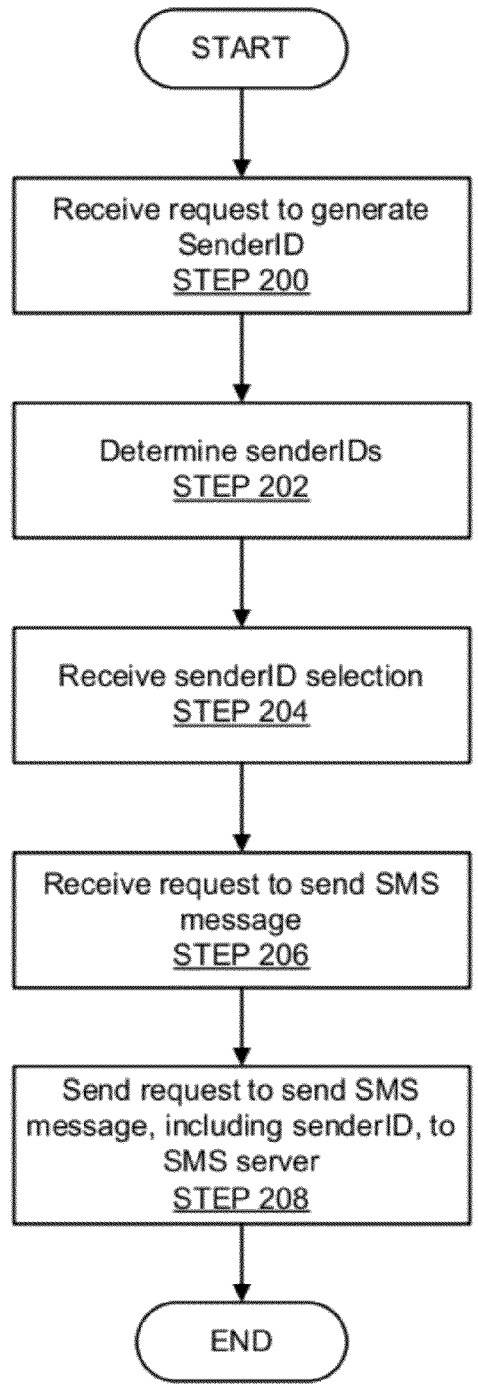
FIGS. 2 and 3 show flowcharts of methods in accordance with one or more embodiments of the invention.

FIG. 2 shows a flowchart of a method for sending an SMS with a senderID. The method of FIG. 2 may be implemented, for example, using the system of FIG. 1. In one or more embodiments of the invention, one or more of the steps shown in FIG. 2 may be omitted, repeated, and/or performed in a different order than the order shown in FIG. 2. Accordingly, the scope of the invention should not be limited to the specific arrangement of steps shown in FIG. 2.

Initially, in step 200, a request to generate a senderID is received. In one or more embodiments of the invention the request may include the name of a business. However, the name may be any name that a user wishes to use as the basis for a senderID. The name may be of any length. In one or more embodiments of the invention, the request may be received at a client device. Alternatively, the request may be received at a server or other suitable device.

In Step 202, senderIDs are determined. In one or more embodiments of the invention, multiple senderIDs may be determined. Alternatively, a single senderID may be determined. In one or more embodiments of the invention, senderIDs may be determined on a mobile device. Alternatively, a server may determine the senderIDs. In one or more embodiments of the invention, a "best" senderID may be suggested. In one or more embodiments of the invention, the "best" senderID may be determined using weights assigned to words. For example, common words such as "the" may have a very low weight assigned to them, while less common words may have a high(er) weight associated with them. The "best" senderID may then be suggested based on the total weight of the words present in the senderID. SenderIDs may be determined using a variety of methods, as discussed later in FIG. 3.

In Step 204, a selected senderID is received. The selected senderID is the senderID that the user wishes to use as his identifying name on messages sent using the method of the invention. The senderID may be selected using a client device, or any other suitable device. In one or more embodiments of the invention, the selected senderID may be stored on the client device. Alternatively, the selected senderID may be stored on the Short-name Server, or any other suitable device. In still another embodiment, the selected senderID may not be stored.

In Step 206, a request to send an SMS message using a senderID is received. In one or more embodiments of the invention, the message may be in a different format than SMS. In one or more embodiments of the invention, the request may initially be received by a client device and then be sent to the Short-message server or other suitable device. Alternatively, the Short-message server or other suitable device may receive the request directly. For example, the request may be received using a web client or application. In one or more embodiments of the invention, the request may include the message to be sent as well as the senderID to be used. Alternatively, the request may contain different components. It will be apparent to one of ordinary skill in the art that the request will contain everything necessary to send the desired SMS message.

In Step 208 a request to send the SMS message, including the senderID, is sent to an SMS server. In one or more embodiments of the invention, a Short-name Server, or other suitable device, may send the request. Alternatively, the request may be sent directly from a client device. In one or more embodiments of the invention, the request may be sent in SMS format. Alternatively, any other suitable format may be used.

Figure 3:
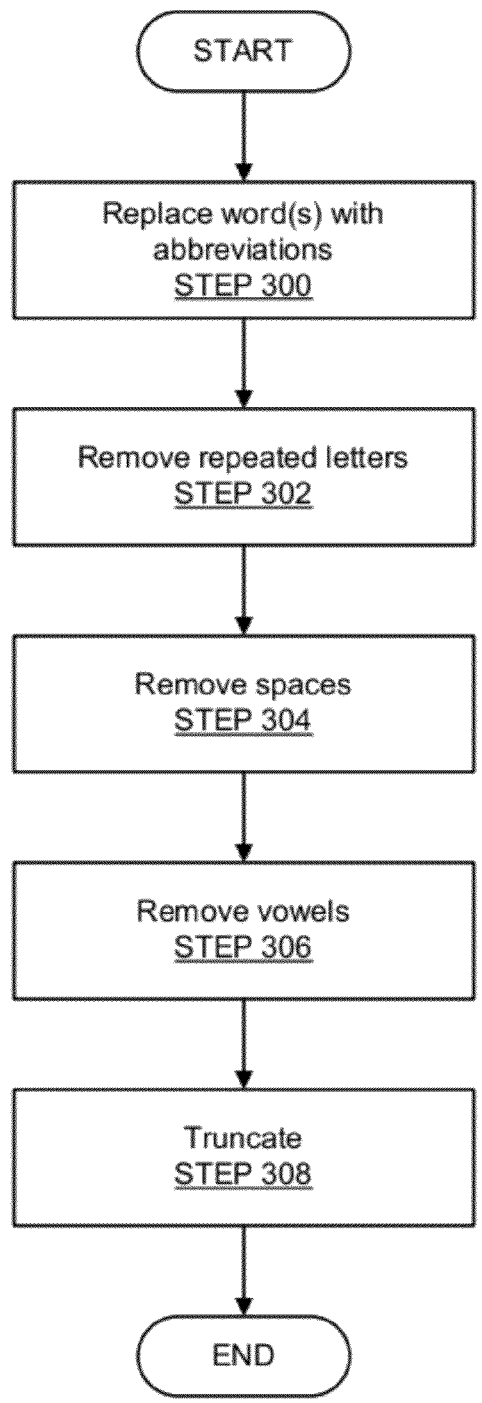

FIG. 3 shows a flowchart of a method for determining a senderID. The method of FIG. 3 may be used during the execution of the method in FIG. 2, particularly Step 202. The method of FIG. 3 may be implemented, for example, using the system of FIG. 1. In one or more embodiments of the invention, one or more of the steps shown in FIG. 3 may be omitted, repeated, and/or performed in a different order than the order shown in FIG. 3. Accordingly, the scope of the invention should not be limited to the specific arrangement of steps shown in FIG. 3.

In one or more embodiments of the invention, the method of FIG. 3 may produce many different senderIDs. For example, anytime that a step reduces the business name below a predetermined length (e.g., 8 characters, 10 characters, etc) a senderID may be produced. In one or more embodiments of the invention, the method may stop after producing a senderID. Alternatively, the method may continue so that multiple senderIDs may be produced. In one or more embodiments of the invention, each step may be performed multiple times in different ways, so that multiple senderIDs may be produced. It will be apparent to one of ordinary skill in the art that the method of FIG. 3 may be performed in many different ways, may be repeated, and may produce any number of senderIDs and, as such, should not be limited to any specific embodiment described below.

Initially, in Step 300, suitable words within the business name are replaced with abbreviations. In one or more embodiments of the invention, suitable words for replacement may be maintained in a repository, and then compared against the words of the business name. Alternatively, suitable words for replacement may be determined in any other way. In one or more embodiments of the invention, some words may be ignored, rather than replaced, in this step. For example, words such as "the," "a," "of," and other similar words may be removed entirely.

In Step 302, repeated letters are removed. In one or more embodiments of the invention, a repeated letter may be the two t's in "letter." Alternatively, a repeated letter may be any letter that is repeated within a single word or the business name. In one or more embodiments of the invention, the repeated letter may be reduced to a single occurrence (e.g., "letter" to "leter"). Alternatively, the repeated letters may be removed altogether, or in any other suitable way.

In Step 304, spaces within the business name are removed. In one or more embodiments of the invention, all spaces may be removed. Alternatively, less than every space may be removed. In one or more embodiments of the invention, spaces may be removed from right to left. Alternatively, spaces may be removed from left to right, or in any other suitable method.

In Step 306, vowels are removed from the business name. In one or more embodiments of the invention, the vowels may be removed from right to left. Alternatively, the vowels may be removed from left to right. The vowels may be removed from right to left so that the first words within a business name retain their vowels. In one or more embodiments of the invention some vowels may not be removed. Alternatively, all vowels may be removed.

Finally, in Step 308, the business name is truncated. In one or more embodiments of the invention, the business name is truncated at the maximum allowable length for a senderID. Alternatively, the business name may be truncated before the maximum allowable length. It will be apparent to one of ordinary skill in the art that truncating is a last resort method of fitting the business name within the maximum allowable length of a senderID, and as such, should not be limited to any specific embodiment.

FIGS. 4A-C show examples in accordance with one or more embodiments of the invention. Specifically, the example in FIGS. 4A-C show sending and receiving a message having a senderID. It will be apparent to one of ordinary skill in the art that the example in FIGS. 4A-C is only a representative example and, as such, the invention should not be limited to the specific example set forth in FIGS. 4A-C.

In FIG. 4A, Client Device (400) is shown. Client Device (400) may be any client device as described above. Client Device (400) includes Client Application (402). In FIG. 4A, Client Application (402) is currently displayed on the screen of Client Device (400). The screen shows that the business name "The Best Cleaners" has been entered. Additionally, senderIDs have been generated based on the business name. These senderIDs are also displayed on Client Device (400): "BestClnr," "BstClnrs," and "BstClean." It will be apparent to one of ordinary skill in the art that many more senderIDs may be generated by the invention and, as such, the invention should not be limited to the above examples. Further, the example above uses a senderID with a length of 8 characters. However, it will be apparent to one of ordinary skill in the art that a senderID may be of any length, and as such, the invention should not be limited to the above example. In one or more embodiments of the invention, the senderIDs may be presented based on a score or other metric. For example, the "best" senderID may be displayed first. Alternatively, the senderIDs may be presented in the order that they were generated, or in no particular order.

In between FIG. 4A and FIG. 4B, the client selects a senderID. In the present example, "BestClnr" has been selected as the senderID. In FIG. 4B, the same Client Device (400) and Client Application (402) as FIG. 4A is shown. Specifically, in FIG. 4B, the client is shown entering a message to be sent using the selected senderID. In this example, the message is, "Visit the store today and receive 15% off by presenting this message at the cash register!" It will be apparent to one of ordinary skill in the art that any message may be sent using the method of the present invention and, as such, the invention should not be limited to the above example. Before FIG. 4C, the message entered in FIG. 4B is sent.

FIG. 4C shows Mobile Device (404). Mobile Device (404) may be any device as previously described. It will be apparent to one of ordinary skill in the art that Mobile Device (404) is an intended recipient of a message containing a senderID, and as such, should not be limited to any particular device. Mobile Device (404) is shown displaying SMS Message (406). In particular, SMS Message (406) is the message sent in FIG. 4B. The message contains SenderID (408) identifying the sender as "BestClnr."

Figure 5:
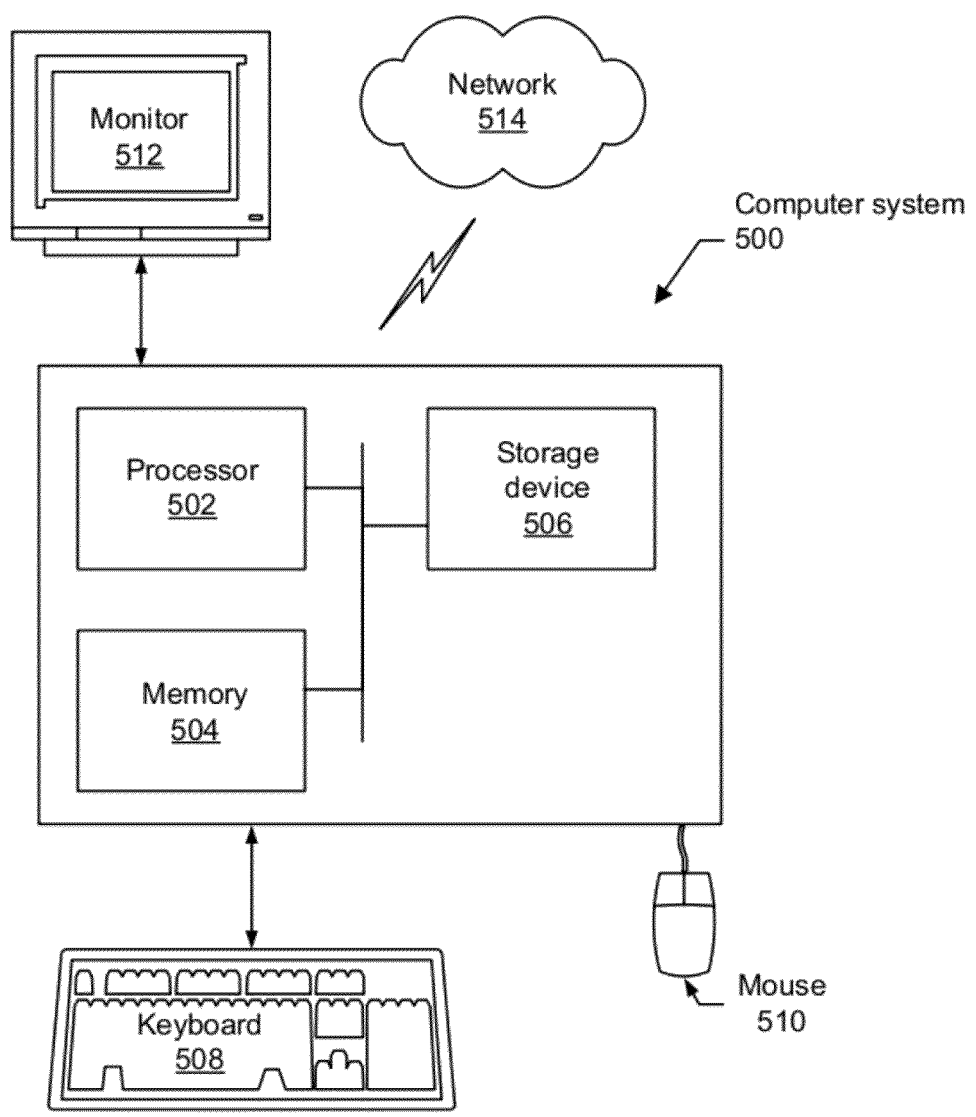
FIG. 5 shows a diagram of a computer system in accordance with one or more embodiments of the invention.

Embodiments of the invention may be implemented on virtually any type of computer, including mobile devices (e.g., cell phone, PDA, laptop, portable gaming device, etc.), regardless of the platform being used. For example, as shown in FIG. 5, a computer system (500) includes one or more processor(s) (502) such as a central processing unit (CPU), integrated circuit, etc., associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms, now known or later developed. Generally speaking, the computer system (500) includes at least the minimal processing, input, and/or output means necessary to particularly practice embodiments of the invention.

Further, those skilled in the art will appreciate that one or more elements of the aforementioned computer system (500) may be located at a remote location and connected to the other elements over a network (514). Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a non-transitory computer readable storage medium such as a compact disc (CD), a diskette, a memory stick, a solid state memory device, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for sending Short Message Service (SMS) messages, comprising:
   receiving, from a client device, a request to generate a senderID,
      wherein the request comprises a business name, and
      wherein the senderID is a shortened version of the business name for identifying a sender of an SMS message;
   determining a plurality of senderIDs based on the business name;
   receiving, from the client device, a selected senderID from the plurality of senderIDs;
   receiving, from the client device, a request to send an SMS message comprising the selected senderID; and
   sending a request to an SMS server to send the SMS message,
      wherein the SMS message comprises the selected senderID, and
      wherein the SMS server sends the SMS message to a plurality of mobile devices.

2. The method of claim 1, wherein determining the plurality of senderIDs further comprises:
   for each of the plurality of senderIDs, performing at least one selected from the group consisting of: replacing at least one word of the business name with an abbreviation, removing at least on repeated letter of the business name, removing at least one space in the business name, removing at least one vowel in the business name from right to left, and truncating the business name.

3. The method of claim 2, wherein each of the plurality of senderIDs is of a predetermined length, and wherein the predetermined length satisfies a requirement of a governmental agency.

4. The method of claim 2, wherein each word of the business name is assigned a weight, and wherein the weight determines whether the word is used to determine each of the plurality of senderIDs.

5. The method of claim 4, further comprising:
   identifying one of the plurality of senderIDs as a suggested senderID, based on at least the weight of a word used to determine the suggested senderID.

6. The method of claim 1, further comprising:
   storing the selected senderID, wherein the selected senderID is associated with the client device.

7. The method of claim 1, wherein determining the plurality of senderIDs is performed by the client device.

8. A system for sending Short Message Service (SMS) messages, comprising:
   a client device; and a short-name server, operatively connected to the client device and comprising a memory and a processor operatively connected to the memory having functionality to execute instructions for:
receiving, from the client device, a request to generate a senderID,
wherein the request comprises a business name, and
wherein the senderID is a shortened version of the business name for identifying a sender of an SMS message;
determining a plurality of senderIDs based on the business name;
receiving, from the client device, a selected senderID from the plurality of senderIDs;
receiving, from the client device, a request to send an SMS message comprising the selected senderID; and
sending a request to an SMS server to send the SMS message,
wherein the SMS message comprises the selected senderID, and
wherein the SMS server sends the SMS message to a plurality of mobile devices.

9. The system of claim 8, wherein determining the plurality of senderIDs further comprises:
for each of the plurality of senderIDs, performing at least one selected from the group consisting of: replacing at least one word of the business name with an abbreviation, removing at least on repeated letter of the business name, removing at least one space in the business name, removing at least one vowel in the business name from right to left, and truncating the business name.

10. The system of claim 9, wherein each of the plurality of senderIDs is of a predetermined length, and wherein the predetermined length satisfies a requirement of a governmental agency.

11. The system of claim 9, wherein each word of the business name is assigned a weight, and wherein the weight determines whether the word is used to determine each of the plurality of senderIDs.

12. The system of claim 11, further comprising functionality for:
identifying one of the plurality of senderIDs as a suggested senderID, based on at least the weight of a word used to determine the suggested senderID.

13. The system of claim 8, further comprising functionality for:
storing the selected senderID, wherein the selected senderID is associated with the client device.

14. The system of claim 8, wherein determining the plurality of senderIDs is performed by the client device.

15. A computer readable storage medium comprising instructions for sending Short Message Service (SMS) messages, the instructions comprising functionality to:
receive, from a client device, a request to generate a senderID,
wherein the request comprises a business name, and
wherein the senderID is a shortened version of the business name for identifying a sender of an SMS message;
determine a plurality of senderIDs based on the business name;
receive, from the client device, a selected senderID from the plurality of senderIDs;
receive, from the client device, a request to send an SMS message comprising the selected senderID; and
send a request to an SMS server to send the SMS message,
wherein the SMS message comprises the selected senderID, and
wherein the SMS server sends the SMS message to a plurality of mobile devices.

16. The computer readable storage medium of claim 15, wherein the instructions for determining the plurality of senderIDs further comprise functionality to:
for each of the plurality of senderIDs, perform at least one selected from the group consisting of: replacing at least one word of the business name with an abbreviation, removing at least on repeated letter of the business name, removing at least one space in the business name, removing at least one vowel in the business name from right to left, and truncating the business name.

17. The computer readable storage medium of claim 16, wherein each of the plurality of senderIDs is of a predetermined length, and wherein the predetermined length satisfies a requirement of a governmental agency.

18. The computer readable storage medium of claim 16, wherein each word of the business name is assigned a weight, and wherein the weight determines whether the word is used to determine each of the plurality of senderIDs.

19. The computer readable storage medium of claim 18, the instructions further comprising functionality to:
identify one of the plurality of senderIDs as a suggested senderID, based on at least the weight of a word used to determine the suggested senderID.

20. The computer readable storage medium of claim 15, the instructions further comprising functionality to:
store the selected senderID, wherein the selected senderID is associated with the client device.

* * * * *